United States Patent
Cuttner et al.

(10) Patent No.: US 7,434,142 B2
(45) Date of Patent: Oct. 7, 2008

(54) SYSTEMS AND METHODS FOR PERFORMING QUALITY ASSURANCE ON INTERACTIVE TELEVISION AND SOFTWARE APPLICATION DATA DELIVERED VIA A NETWORK

(75) Inventors: Craig D. Cuttner, Norwalk, CT (US); Robert M. Zitter, Stamford, CT (US)

(73) Assignee: Home Box Office, Inc., New York, NY (US)

( * ) Notice: Subject to any disclaimer, the term of this patent is extended or adjusted under 35 U.S.C. 154(b) by 810 days.

(21) Appl. No.: 10/620,964

(22) Filed: Jul. 15, 2003

(65) Prior Publication Data

US 2004/0133839 A1  Jul. 8, 2004

Related U.S. Application Data

(60) Provisional application No. 60/396,119, filed on Jul. 15, 2002.

(51) Int. Cl.
*H03M 13/00* (2006.01)
(52) U.S. Cl. .................... 714/774; 714/776
(58) Field of Classification Search ............. 714/748, 714/776, 774
See application file for complete search history.

(56) References Cited

U.S. PATENT DOCUMENTS

| | | | | |
|---|---|---|---|---|
| 5,341,384 A * | 8/1994 | Miya et al. | | 714/747 |
| 5,418,713 A | 5/1995 | Allen | | |
| 5,642,365 A * | 6/1997 | Murakami et al. | | 714/761 |
| 5,844,918 A * | 12/1998 | Kato | | 714/751 |
| 6,026,088 A | 2/2000 | Rostoker et al. | | |
| 6,320,829 B1 | 11/2001 | Matsumoto et al. | | |
| 6,411,623 B1 | 6/2002 | DeGollado et al. | | |
| 6,735,726 B2 * | 5/2004 | Muranaka et al. | | 714/708 |
| 6,850,559 B1 * | 2/2005 | Driessen et al. | | 375/219 |
| 7,088,398 B1 * | 8/2006 | Wolf et al. | | 348/423.1 |
| 7,243,291 B1 * | 7/2007 | Williams | | 714/776 |

OTHER PUBLICATIONS

"Automated Monitoring for Cable & Satellite Networks" www.testquest.com, 2002.
"Interactive Television" www.testquest.com, 2002.
"Automated Testing for Interactive TV" www.testquest.com, 2002.
Solution Guide, www.testquest.com.
"Multi-Target Set-Top Box Testing" www.testquest.com, 2002.

(Continued)

*Primary Examiner*—Mujtaba K Chaudry
(74) *Attorney, Agent, or Firm*—Kenyon & Kenyon LLP

(57) ABSTRACT

A system and method for providing quality assurance for interactive television and software application data packages delivered via a network. By employing "code checks" that determine "code points" based on the original package, content or data packages may be checked for errors at any later point within the network path from the provider to the subscriber. The data package can be checked for errors by performing some or all of the code checks and comparing the current code point values to the original code point values. If the current values differ from the original values, then the data package has changed and an error is likely to have occurred. Further action may then be taken to determine the nature of the error and to respond to it.

42 Claims, 2 Drawing Sheets

OTHER PUBLICATIONS

"Set-Top Box Testing" www.testquest.com, 2001.
"OpenTV" www.testquest.com, 2001.
"SeaChange International, Inc." www.testquest.com, 2001.
"Sony Electronics" www.testquest.com, 2001.
"WorldGate Communications, Inc." www.testquest.com, 2001.
"S-Video Capture Module" www.testquest.com, 2001.
"Infrared (IR) Simulation Module" www.testquest.com, 2001.

* cited by examiner

SYSTEMS AND METHODS FOR PERFORMING QUALITY ASSURANCE ON INTERACTIVE TELEVISION AND SOFTWARE APPLICATION DATA DELIVERED VIA A NETWORK

This application claims priority to, and incorporates herein by reference in its entirety, U.S. Provisional Application No. 60/396,119, entitled "SYSTEMS AND METHODS FOR PERFORMING QUALITY ASSURANCE ON INTERACTIVE TELEVISION AND SOFTWARE APPLICATION DATA DELIVERED VIA A NETWORK," which was filed on Jul. 15, 2002.

FIELD OF THE INVENTION

The present invention is directed to systems and methods for performing quality assurance on interactive television and software application data that is delivered via a network.

BACKGROUND OF THE INVENTION

Any data which is delivered over a network is vulnerable to having errors introduced into the data. This problem is particularly prevalent in networks with multiple components and especially where no single entity controls all of the network components between the sender and receiver of the data.

For example, networks which deliver interactive television have many components which are likely to be geographically remote from one another and are frequently under the control of a multiple entities. An example of this kind of network is one where a content provider (e.g., Home Box Office® (HBO®)) has provided content (e.g., a movie) to an interactive television service provider for delivery to subscribers using a Video-On-Demand (VOD) system where the subscriber selects a movie using a Graphical User Interface (GUI).

FIG. 1 shows an example of a network implementing a VOD service. The content provider prepares and delivers a Movies-On-Demand (MOD) data package 100 to an interactive television service provider. The MOD package 100 contains the audio and video for the movie as well as other data that is used to provide at least part of the GUI display that the subscriber views when ordering a movie.

The interactive television service provider loads the MOD package into an Asset Management/Business Management system such as the MediaPath™ system by N2Broadband, Inc of Duluth, Ga. The Asset Management Server (AMS) 110 maintains a catalogue of the content (e.g., movies in this case) that is available on the VOD service. The Business Management Server (BMS) 120 handles the business and billing aspects of the VOD service by, for example, applying business rules to perform subscription checking and ensuring that subscribers are properly billed for their use of the service. The audio and video that are to be delivered to the subscriber when a movie is ordered are then stored in one or more VOD servers 140 (e.g., a MediaCluster™ by SeaChange International of Maynard, Mass.) that may be located remotely from the AMS 110 and BMS 120 so as to serve geographically diverse subscribers. The interaction over the network between the subscribers and the VOD service is managed by a Digital Storage Management-Command and Control (DSM-CC) 130 data carousel such as the Digital Network Control System (DNCS) by Scientific-Atlanta, Inc. of Lawrenceville, Ga.

Each subscriber has a Set Top Box (STB) 160 which connects to the subscriber's television 170 and connects to the DSM-CC 130, VOD server 140, AMS 110, and BMS 120 via the "cable plant" 150 of the subscriber's cable provider (which may or may not be the same as the interactive television service provider). This cable plant consists primarily of the various hardware and software components (e.g., network switches, etc) required to provide connectivity between the STB 160 and the VOD service components. The STB 160 may be, for example, a Scientific-Atlanta Explorer 3000® running PowerTV® operating system software and the Prasara user interface application.

When a subscriber accesses the VOD service to order a movie, the subscriber is first presented with the GUI, including information from the MOD package 100 as provided by the AMS 110. The subscriber may then request to order the movie. The request to order the movie is routed through the DSM-CC 130 to the BMS 120 to determine if the subscriber is authorized to order the movie and ensuring that billing for the service is properly handled. Once the BMS 120 authorizes the movie order request, a VOD server 140 streams the movie audio and video to the STB 160 which decodes the data and plays the movie on the subscriber's TV 170.

There are numerous opportunities at a variety of places in the network for errors to be introduced into the GUI that is displayed to the user, and even the movie data itself. For example, the interactive television service provider may manually load the MOD package 100 into the AMS 120, possibly editing portions of the GUI data in the process, and errors may be introduced into the data. In another example, errors may be introduced simply through corrupted transmission from one component in the network to another especially when data elements from the same data package are stored on different components in the system. Errors may also be introduced due to inconsistencies between the software in different models of STBs.

These errors may be as trivial as a misspelling in the title of the movie or the artwork to be displayed on the GUI may be corrupted. These errors may also be much more serious such as the complete corruption of the movie's audio or video or the mismatching of different data elements such as misclassification of adults-only material as children's content.

Present quality assurance techniques rely on direct inspection by a human, which is not practical, or on dedicated testing systems such as the TestQuest Pro™ system by TestQuest, Inc. of Minneapolis, Minn., which are computationally intensive and cannot simply and easily address errors that are introduced during transmission to the subscriber.

SUMMARY

The present invention provides a system and method for providing quality assurance for interactive television and software application data delivered via a network. Example embodiments of the present invention employ "code checks" that determine "code points" (e.g., a value, code, message, marker or pattern used for integrity checking) based on the original, error-free content as a way to check the content or data package for changes or errors at any later point within the network path from the provider to the subscriber.

Using the code checks, at any point in the network path from the provider to the subscriber, the data can be checked for changes or errors by performing some or all of the code checks and comparing the currently determined code point values to the originally determined code point values. If the current values differ from the original or "desired" values, then the data has changed and an error is likely to have occurred. Further action may then be taken to determine the nature of the change or error and to respond to it.

Code checks may ensure the integrity of a related set of data, thus for the first time allowing a data provider to be confident that the related set of data is received in its intended form.

DETAILED DESCRIPTION

Figure 1:
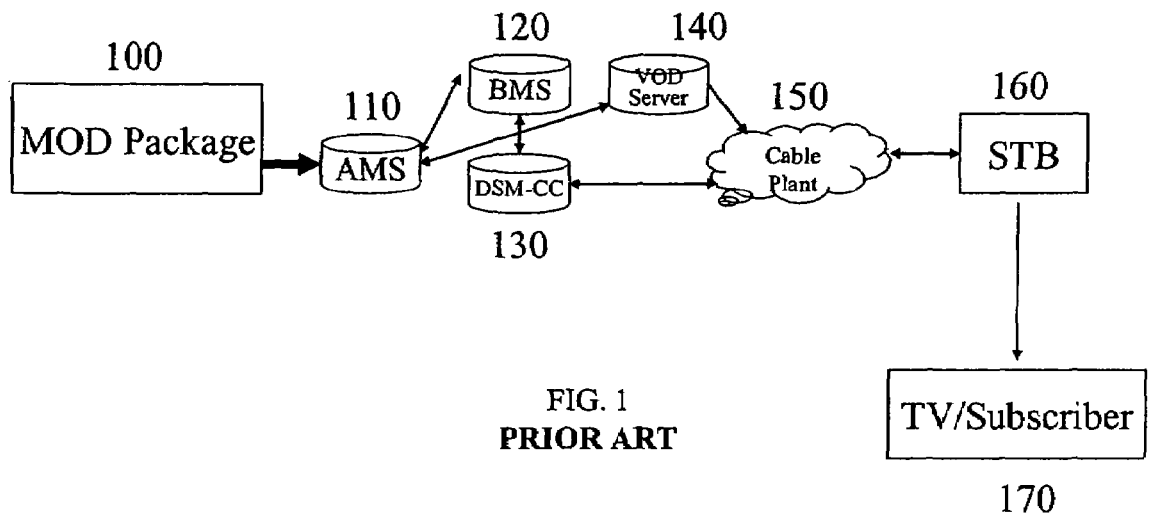
FIG. 1 illustrates one possible network in which the system and method of the present invention could be implemented.
Figure 2:
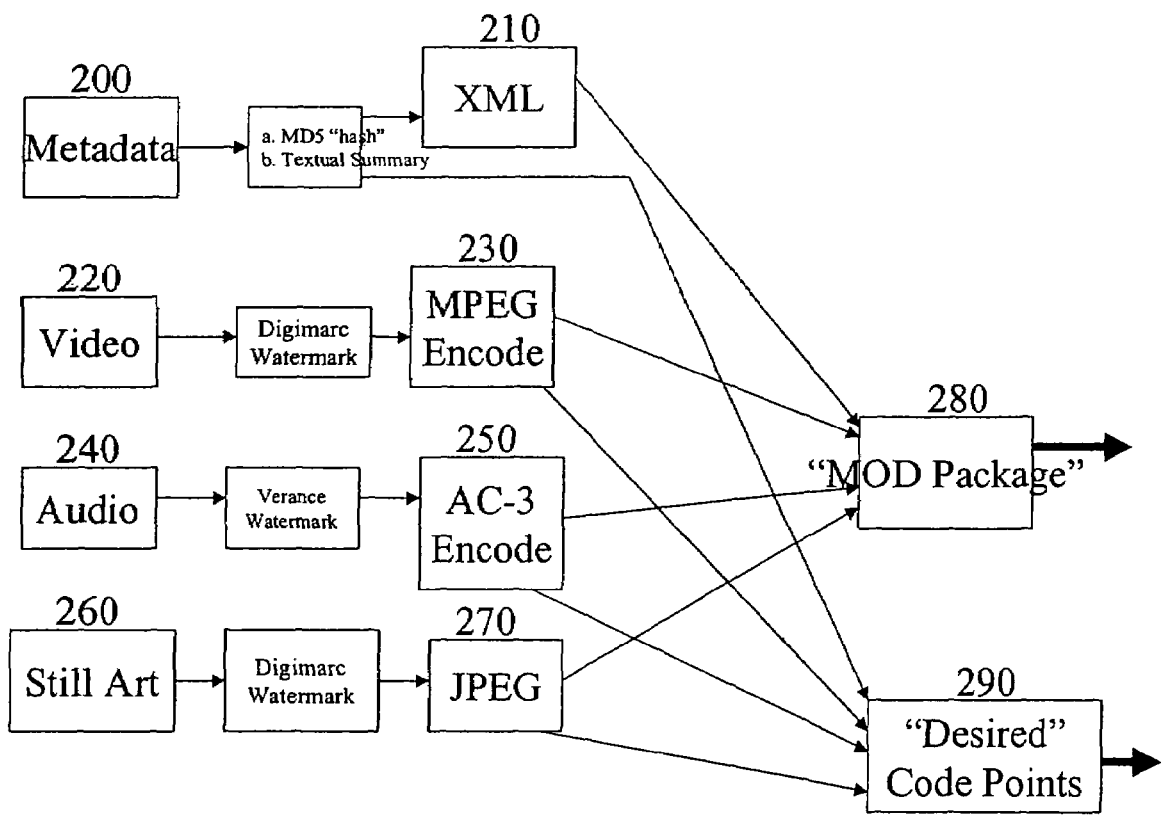
FIG. 2 illustrates one possible embodiment for establishing the desired code points of the system and method of the present invention.

As shown in FIG. 2, in one possible embodiment of the present invention, when the MOD package 280 is being assembled at the content provider, code points 290 are determined for the "desired" (e.g., error-free) content. This content may include, for example, audio 240 and video 220 that may be encoded using, for example, Dolby Labs' AC-3® encoding 250 and MPEG (Motion Picture Experts Group) encoding 230. The content may also include still art 260, such as promotional artwork, encoded using, for example, JPEG (Joint Photographic Experts Group) encoding 270, textual data such as title, cast, and ratings information (e.g., G, PG, R, etc.), and metadata 200 that describes how the GUI is displayed on the screen in, for example, XML format 210. A code point for each of the elements (e.g., audio, video, still art, textual data, ratings information, metadata, etc) of the MOD package may be determined by a code check.

These code checks may be any of a variety of well known techniques for integrity checking. One possible method is to calculate a hash code or checksum for each of the data elements. Another possible technique is to use watermarks such those of Verance Corporation or Digimarc Corporation to embed a code point within an audio, video or graphic element. Simple techniques may also be used as code checks, such as performing a spell check of the text within the content or determining a summary of the text within the content to provide a code point. The set of desired code points which is determined from the code checks also may be protected from tampering by, for example, digitally signing them.

The desired code points may be included within the content package as a separate data field, embedded directly within the content or packaged separately. The desired code points also may be calculated before, after or during the process of assembling the content package.

Figure 3:
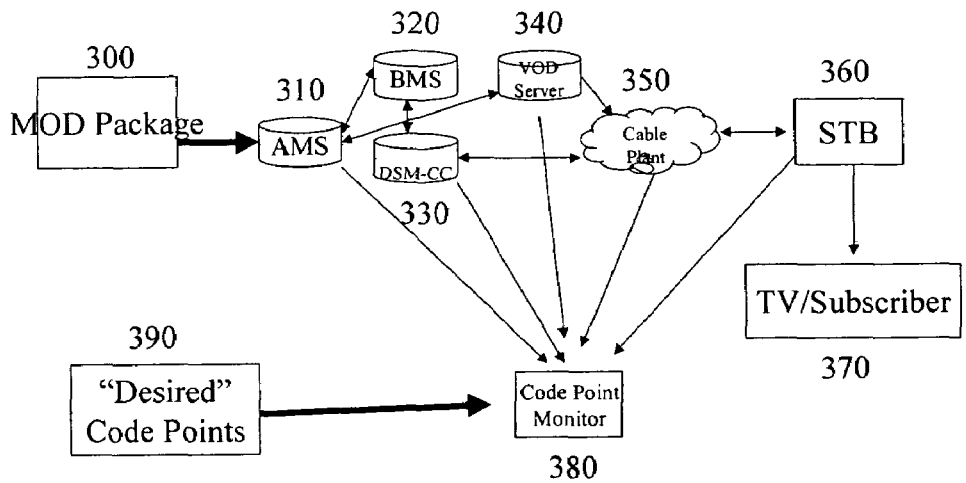
FIG. 3 illustrates one possible embodiment for checking the code points of the system and method of the present invention.

As shown in FIG. 3, the MOD data package 300 may then be sent to the interactive television provider, and the set of desired code points 390 associated with the MOD data package 300 may be sent separately to a code point monitoring system 380 that may be implemented within the interactive television network (e.g., as software running on one the network elements described previously). Alternatively, the code point monitor may be implemented on a separate piece of hardware or network of hardware such as a computer server or the like. The code point monitor may then access the data package at any number of places within the network to verify the integrity of the data. For example, the code point monitor may check the data after the data package has been loaded into the AMS 310 and BMS 320, before it is distributed to the VOD servers 340. Alternatively, the code point monitor may check the data when it is passing through components in the cable plant 350 on its way to the user or when it is passing through the DSM-CC 330. The code point monitor may also check the data when it has been received by the STB 360 before being sent to the subscriber's TV 370.

When the code point monitor 380 is, for example, checking the data after it has been loaded into the AMS 310, the code point monitor may request a copy of the data package 300 from the AMS 310. The data package is then matched to a particular set of desired code points 390 using, for example, a unique identifier. Once the code point monitor 380 receives the data package 300, new code points are determined for the data package using the same code checks that were used at the content provider. The new code points are then compared to the set of desired code points 390 that the code point monitor 380 has received from the content provider either via the interactive television network or via some other network. If the new code points are identical to the desired code points, then the data has not been altered since the desired code points were determined. If the new code points differ from the desired code points then the data has been altered and errors may have been introduced. By considering each code point individually, the code point monitor may then determine which data elements have been changed depending on which code points are different from their desired values. For example, if the watermark that was in the audio signal has been altered or is not present then the audio has been altered in some way. In some cases, although the desired code points and new code points are not identical, they may be sufficiently similar that the data may be determined to still be accurate enough for use. For example, if an audio signal is altered, the watermark which was embedded in it will also be altered. However, the code point monitor may determine that the alteration to the watermark is minor and thus the changes to the audio signal are minor enough that the signal may still be used. By comparing the entire set of code points, the code point monitor 380 may also detect if an entire data element is missing or if a data element has been replaced with a data element that belongs in a different data package.

Errors may also be detected in the set of code points 390 itself. For example, if code points that have been digitally signed are tampered with, then an error may be determined to have occurred. An error may also be determined to have occurred if the code point monitor 380 has not received the set of desired code points 390 for the data package 300 (e.g., the data package was supposed to include the desired code point information and does not, or the code point monitor never received the desired code point information through its normal means of doing so).

After an error or alteration has been detected, the code point monitor may take a variety of actions. For example, if the error is a misspelling in the text of the data package, the code point monitor 380 may attempt to correct the error. In another example, the code point monitor 380 may request that the entire data package 300 or a particular data element of the data package 300 be retransmitted to the particular component that the code point monitor 380 is checking (e.g., the code point monitor 380 may request the content provider to send a new copy of the data package 300 or data element to the AMS 310 so that the error is corrected before the data is passed on to the VOD servers 340). The code point monitor 380 may also prevent the content from be accessed (e.g., when the classification has been altered) or simply prevent a portion of the content from being displayed (e.g., if the GUI graphics have been corrupted, the text could still be displayed and the content accessed, but the graphic would not display).

The code point monitor 380 may also log that the error has occurred or report the error to some other component in the network.

For example, the code point monitor 380 may check the data package 300 as it passes through the cable plant 350 on its way to the subscriber's STB 360. The individual data elements of the data package 300 have been sent from different components in the interactive television provider's network (i.e., the metadata and other GUI information has been sent from the AMS 310 via the DSM-CC 330 while the audio and video have been sent from the VOD server 340). However, an error may have occurred because while the metadata and GUI information are for an animated children's program, the audio and video are for the television show "The Sopranos." The code point monitor 380 performs the appropriate code check on each of the data elements and then compares the determined current code point values to the set of desired code point values 390. In performing that comparison, the code point monitor 380 discovers the mismatched content because the current code points for the video and audio data elements do not match the audio and video code points in the set of desired code points 390 while the current metadata and GUI information code points do match their respective desired code points. The code point monitor then blocks the content from being viewed, thus preventing the possibility that a child would be exposed to inappropriate material.

Figure 4:
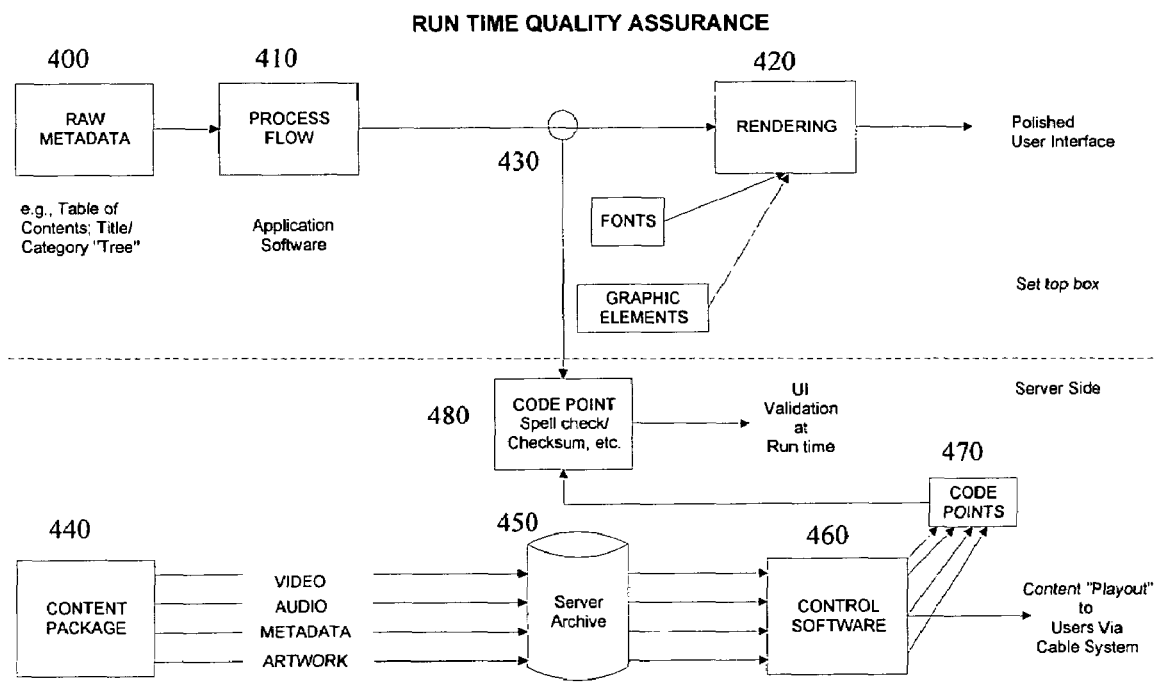
FIG. 4 illustrates another possible embodiment of the system and method of the present invention.

An alternative embodiment of the system and method of the present invention is shown in FIG. 4. As shown in FIG. 4, a content package 440 containing video, audio, metadata and artwork is delivered to a server archive 450. Control software 460 then calculates desired code point values for the various data elements in the package and separates them from the content package 440. The content package 440 is then "played out" to the users of the service via the cable television system. When the content is received by the user's STB, the metadata 400 is processed by the application software 410 of the STB. The current code point values 430 for the metadata are then calculated and sent back to the server side 480 to be compared with the desired code point values 470 to validate that the user interface data is correct or to take corrective action if necessary. The STB can then render 420 the metadata 400 using the appropriate fonts and graphics to provide a polished user interface to the user of the system.

In another alternative embodiment, the code point monitor may be implemented within the subscriber's STB itself. In this embodiment, when the data is received the STB may perform code checks on it before or while the STB is displaying the GUI data or playing the video or audio. The STB may also perform all the post-error detection actions that were previously explained, including data correction, content blocking, and error logging and reporting.

The code point monitor may be configured to perform the code checks on every piece of content or to perform the checks only under certain conditions. For example, the code point monitor may check a data package only the first time it is loaded into the system or the first time that it is accessed. In another example, the code point monitor may perform random checks on data packages. In another example, the code point monitor may perform code checks only when the hardware on which it is operating has excess processor time (e.g., the processor has idle processor time that it is not using for other tasks). The code point monitor may also only perform code checks when an operator or subscriber requests that a check be performed, for example.

Certain code checks may not require a code point to be included. For example, if the text in the package contains only typical English words then a spell check code check could be performed using any standard spell check dictionary. The absence of any desired code point for a spell check could then indicate that if any word in the text is not present in the dictionary then an error has occurred in the data.

The present invention is not limited to the specific embodiments described. It is expected that those skilled in the art will be able to devise other implementations that embody the principles of the present invention and remain within its scope. For example, although explained here in regard to interactive television applications, the present invention may also be applied in other situations where data packages are transmitted over a network and the integrity of the data package cannot be ensured, such as applications which send data packages over the Internet. Furthermore, although explained here in regard to a cable television network, the present invention may also be used with any other kind of networks where it is important to be able to detect errors and respond to them. For example, the present invention may also be used with wireless networks such as satellite transmission or cellular transmission. The network used with the present invention may also employ combinations of networking technologies.

What is claimed is:

1. A method for detecting errors in a data package, comprising:
   receiving at least two data elements;
   receiving, separately and at a different time from the at least two data elements, a set of desired code point values corresponding to a data package;
   determining a set of current code point values for the at least two data elements; and
   comparing the set of current code point values to the set of desired code point values.

2. The method of claim 1, further comprising:
   determining if a change has occurred in the data package based on the comparison of the sets of code point values; and
   if a change is determined to have occurred, requesting retransmission of at least one of the at least two data elements.

3. The method of claim 1, further comprising:
   determining if a change has occurred in the data package based on the comparison of the sets of code point values; and
   if a change is determined to have occurred, preventing the use of at least one of the at least two data elements.

4. The method of claim 1, further comprising:
   determining if a change has occurred in the data package based on the comparison of the sets of code point values; and
   if a change is determined to have occurred:
      identifying the particular data element, of the at least two data elements, in which the change occurred, and
      determining a corrective action to perform.

5. The method of claim 4, wherein the corrective action is requesting a retransmission of at least one of the at least two data elements.

6. The method of claim 4, wherein the corrective action is preventing use of at least one of the at least two data elements.

7. The method of claim 4, wherein the corrective action to perform is determined based on characteristics of the particular data element in which the change occurred.

8. The method of claim 1, further comprising:
   determining if a change has occurred in the data package based on the comparison of the sets of code point values; and
   if a change is determined to have occurred:

identifying the particular data element, of the at least two data elements, in which the change occurred, and based on the similarity of a watermark in the particular data element in which the change occurred to a corresponding watermark in the set of desired code point values, determining that the particular data element may still be used.

9. The method of claim 7, wherein the corrective action is determined based on the particular data element in which the change occurred being related to the content rating of the data package.

10. The method of claim 1, wherein the at least two data elements and the set of desired code points are received from at least one network component via different data paths.

11. The method of claim 1, wherein the at least two data elements is received from a first network component and the set of desired code points is received from a second network component.

12. A method for detecting changes in a data package transmitted over a network, comprising:
   receiving, from a first network component, a set of current code point values corresponding to a data package at a code point monitor;
   receiving, from a second network component, a set of desired code point values corresponding to the data package at the code point monitor; and
   comparing the set of current code point values to the set of desired code point values,
   wherein the set of current code point values is determined at the first network component based on the data package received by the first network component.

13. The method of claim 12, wherein the first network component is a set top box.

14. The method of claim 12, wherein the code point monitor logs the result of the comparison.

15. The method of claim 12, further comprising:
   determining if a change has occurred in the data package based on the comparison of the sets of code point values; and
   if a change is determined to have occurred, transmitting an instruction to perform a corrective action.

16. The method of claim 15, wherein the corrective action is preventing use of at least a portion of the data package.

17. The method of claim 15, wherein the corrective action is requesting retransmission of at least a portion of the data package.

18. The method of claim 15, further comprising:
   determining the particular data element in which the change occurred, and
   determining the corrective action based on characteristics of the particular data element in which the change occurred.

19. The method of claim 18, wherein the corrective action is determined based on the particular data element in which the change occurred being related to a content rating of the data package.

20. An article of manufacture comprising a computer-readable medium having stored thereon instructions adapted to be executed by a processor, the instructions which, when executed, define a series of steps to be used to detect errors in a data package, said steps comprising:
   receiving at least two data elements;
   receiving, separately and at a different time from the at least two data elements, a set of desired code point values corresponding to a data package;
   determining a set of current code point values for the at least two data elements; and
   comparing the set of current code point values to the set of desired code point values.

21. The article of manufacture of claim 20, wherein said series of steps further comprise the steps of:
   determining if a change has occurred in the data package based on the comparison of the sets of code point values; and
   if a change is determined to have occurred, requesting retransmission of at least one of the at least two data elements.

22. The article of manufacture of claim 20, wherein said series of steps further comprise the steps of:
   determining if a change has occurred in the data package based on the comparison of the sets of code point values; and
   if a change is determined to have occurred, preventing the use of at least one of the at least two data elements.

23. The article of manufacture of claim 20, wherein said series of steps further comprise the steps of:
   determining if a change has occurred in the data package based on the comparison of the sets of code point values; and
   if a change is determined to have occurred:
      identifying the particular data element, of the at least two data elements, in which the change occurred, and
      determining a corrective action to perform.

24. The article of manufacture of claim 23, wherein the corrective action is requesting a retransmission of at least one of the at least two data elements.

25. The article of manufacture of claim 23, wherein the corrective action is preventing use of at least one of the at least two data elements.

26. The article of manufacture of claim 23, wherein the corrective action to perform is determined based on characteristics of the particular data element in which the change occurred.

27. The article of manufacture of claim 20, wherein said series of steps further comprise the steps of:
   determining if a change has occurred in the data package based on the comparison of the sets of code point values; and
   if a change is determined to have occurred:
      identifying the particular data element, of the at least two data elements, in which the change occurred, and
      based on the similarity of a watermark in the particular data element in which the change occurred to a corresponding watermark in the set of desired code point values, determining that the particular data element may still be used.

28. The article of manufacture of claim 26, wherein the corrective action is determined based on the particular data element in which the change occurred being related to the content rating of the data package.

29. The article of manufacture of claim 20, wherein the at least two data elements and the set of desired code points are received from at least one network component via different data paths.

30. The article of manufacture of claim 20, wherein the at least two data elements is received from a first network component and the set of desired code points is received from a second network component.

31. An article of manufacture comprising a computer-readable medium having stored thereon instructions adapted to be executed by a processor, the instructions which, when executed, define a series of steps to be used to detect changes in a data package transmitted over a network, said steps comprising:

receiving, from a first network component, a set of current code point values corresponding to a data package at a code point monitor;

receiving, from a second network component, a set of desired code point values corresponding to the data package at the code point monitor; and comparing the set of current code point values to the set of desired code point values, wherein the set of current code point values is determined at the first network component based on the data package received by the first network component.

32. The article of manufacture of claim 31, wherein the first network component is a set top box.

33. The article of manufacture of claim 31, wherein the code point monitor logs the result of the comparison.

34. The article of manufacture of claim 31, wherein said series of steps further comprise the steps of:

determining if a change has occurred in the data package based on the comparison of the sets of code point values; and if a change is determined to have occurred, transmitting an instruction to perform a corrective action.

35. The article of manufacture of claim 34, wherein the corrective action is preventing use of at least a portion of the data package.

36. The article of manufacture of claim 34, wherein the corrective action is requesting retransmission of at least a portion of the data package.

37. The article of manufacture of claim 34, wherein said series of steps further comprise the steps of:

determining the particular data element in which the change occurred, and determining the corrective action based on characteristics of the particular data element in which the change occurred.

38. The article of manufacture of claim 37, wherein the corrective action is determined based on the particular data element in which the change occurred being related to a content rating of the data package.

39. The method of claim 1, wherein (a) the at least two data elements and (b) the set of desired code point values are received over different communication paths with respect to each other.

40. The method of claim 1, wherein each of the set of desired code point values is successively received relative to one another.

41. The method of claim 1, wherein the at least two data elements are transmitted as a first unit and the set of desired code point values are transmitted as a second unit different from the first unit.

42. A method for detecting errors in a data package, comprising:

receiving a set of desired code point values corresponding to a data package;

storing the set of desired code point values;

after the storing of the set of desired code point values, receiving at least two data elements;

determining a set of current code point values for the at least two data elements; and comparing the set of current code point values to the stored set of desired code point values.

* * * * *